(12) United States Patent
Shin et al.

(10) Patent No.: US 10,160,272 B2
(45) Date of Patent: *Dec. 25, 2018

(54) METHOD AND SYSTEM FOR MONITORING PRESSURE OF TIRE

(71) Applicant: Hyundai Autron Co., Ltd., Seongnam-si (KR)

(72) Inventors: Seung-Hwan Shin, Gwangmyeong-si (KR); Tae-Hun Kim, Yongin-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/210,215

(22) Filed: Jul. 14, 2016

(65) Prior Publication Data
US 2016/0318358 A1 Nov. 3, 2016

Related U.S. Application Data

(63) Continuation of application No. 14/565,386, filed on Dec. 9, 2014, now Pat. No. 9,415,641.

(30) Foreign Application Priority Data

Jul. 7, 2014 (KR) .................. 10-2014-0084404

(51) Int. Cl.
*B60C 23/00* (2006.01)
*B60C 23/06* (2006.01)
(Continued)

(52) U.S. Cl.
CPC ............ *B60C 23/062* (2013.01); *B60C 23/02* (2013.01); *B60S 5/046* (2013.01)

(58) Field of Classification Search
None
See application file for complete search history.

(56) References Cited

U.S. PATENT DOCUMENTS 4,574,267 A 3/1986 Jones
5,606,122 A * 2/1997 Taguchi et al. .............. 73/146.2
(Continued)

FOREIGN PATENT DOCUMENTS

CN 1608012 A 4/2005
CN 102762394 A 10/2012
(Continued)

OTHER PUBLICATIONS

State Intellectual Property Office of the P.R.C., Office Action for Chinese patent application No. 201410640061.4, dated Oct. 17, 2016, China.

(Continued)

*Primary Examiner* — Brent Swarthout
(74) *Attorney, Agent, or Firm* — Baker McKenzie; Hyunho Park

(57) ABSTRACT

Disclosed are a method and a system for monitoring the pressure of a tire. The system measures frequencies of multiple tires mounted on the vehicle, sets a first average frequency for a normal pressure state and a second average frequency for determination of a low pressure state, wherein the first average frequency is calculated by accumulating the measured frequencies for each speed interval in a stop mode and the second average frequency is calculated by accumulating the measured frequencies for each speed interval in a driving mode, calculates low-pressure probabilities for each speed interval of the tire by using the second frequency, a predetermined low-pressure reference frequency, and a predetermined frequency determination interval for determining low-pressure, and determines whether each tire is at low pressure state by aggregating the low-pressure probabilities for each speed interval of the tire.

14 Claims, 3 Drawing Sheets

(51) Int. Cl.
*B60C 23/02* (2006.01)
*B60S 5/04* (2006.01)

(56) References Cited

U.S. PATENT DOCUMENTS

| | | | |
|---|---|---|---|
| 5,801,305 A | | 9/1998 | Kawai et al. |
| 7,203,612 B2 | | 4/2007 | Kobe et al. |
| 9,415,641 B2 | * | 8/2016 | Shin ..................... B60C 23/062 |
| 2002/0095264 A1 | * | 7/2002 | Kamiya ................ B60C 23/061 |
| | | | 702/50 |
| 2003/0080857 A1 | * | 5/2003 | Hartmann ............. B60C 23/061 |
| | | | 340/425.5 |
| 2004/0260436 A1 | * | 12/2004 | Kin ....................... B60C 23/062 |
| | | | 340/442 |
| 2012/0310475 A1 | * | 12/2012 | Fujii .................... G01M 17/021 |
| | | | 701/33.9 |

FOREIGN PATENT DOCUMENTS

| | | |
|---|---|---|
| DE | 695 10 287 T2 | 3/2000 |
| DE | 103 31 585 A1 | 3/2005 |
| EP | 0 700 798 B1 | 6/1999 |
| JP | 2002-240520 A | 8/2002 |
| JP | 2004-142640 A | 5/2004 |
| JP | 2010-151467 A | 7/2010 |

OTHER PUBLICATIONS

German Patent and Trademark Office, Office Action for German patent application No. 10 2014 117 857.2, dated Mar. 14, 2017, Germany.

* cited by examiner

METHOD AND SYSTEM FOR MONITORING PRESSURE OF TIRE

CROSS-REFERENCE TO RELATED APPLICATIONS

This application claims priority to and the benefit of Korean Patent Application No. 10-2014-0084404 filed in the Korean Intellectual Property Office on Jul. 7, 2014, and to a U.S. patent application Ser. No. 14/565,386, filed Dec. 9, 2014, now U.S. Pat. No. 9,415,641, each of which is incorporated herein in its entirety.

TECHNICAL FIELD

The present disclosure relates to a method and a system for monitoring the pressure of a tire, and more particularly, to a method and a system for monitoring the pressure of a tire, which can improve frequency analysis reliability in an indirect tire monitoring system.

BACKGROUND ART

In general, an apparatus and a method for detecting a decrease in air pressure of a tire mounted on a vehicle may be largely divided into two categories, and one is a direct tire pressure monitoring system (TPMS) and the other one is an indirect TPMS.

The direct TPMS as a type in which a sensor is mounted on the tire to perform the pressure of the tire has an advantage in which accurate pressure can be measured, while since the direct TPMS is constituted by various components including a pressure measurement sensor unit and a wireless unit for generally transmitting a measurement value in a wireless manner, and the like, the direct TPMS is higher in price and failure rate than the indirect TPMS. An example of the direct TPMS is U.S. Registration Pat. No. 4,695,823.

Meanwhile, the indirect TPMS is a type that estimates a loss of the air pressure by using a wheel sensor that is mounted on the vehicle to measure a wheel speed. The indirect TPMS has higher prices competiveness than the direct TPMS, but has a problem in which since a resonance frequency varies according to the wheel speed, accuracy slightly decreases.

SUMMARY OF THE INVENTION

The present disclosure has been made in an effort to provide a method and a system for monitoring the pressure of a tire that synthetically determine whether each tire is at low pressure by acquiring accumulation frequencies and low-pressure probabilities of all tires for each speed interval to improve overall frequency analysis reliability.

An exemplary embodiment of the present disclosure provides a system for monitoring the pressure of a tire, the system comprises: a frequency measurement unit configured to measure frequencies of multiple tires mounted on the vehicle; a frequency analysis unit configured to set a first average frequency for a normal pressure state and a second average frequency for determination of a low pressure state, wherein the first average frequency is calculated by accumulating the measured frequencies for each speed interval in a stop mode and the second average frequency is calculated by accumulating the measured frequencies for each speed interval in a driving mode; a calculation unit configured to calculate low-pressure probabilities for each speed interval of the tire by using the second frequency, a predetermined low-pressure reference frequency, and a predetermined frequency determination interval for determining low-pressure; and a determination unit configured to determine whether each tire is at low pressure state by aggregating the low-pressure probabilities for each speed interval of the tire calculated by the calculation unit.

The frequency analysis unit configured to store the number of the accumulated frequencies together with the first average frequency when the number of the accumulated frequencies is more than a predetermined number in a stop mode, and store the number of the accumulated frequencies together with the second average frequency when the number of the accumulated frequencies is more than the predetermined number in a driving mode.

When the determination frequency is larger than a value acquired by adding a predetermined low-pressure reference frequency and a predetermined frequency determination interval for determining low-pressure, the low-pressure probability of the tire is 0%, when the determination frequency is smaller than the value acquired by adding the predetermined low-pressure reference frequency and the predetermined low-pressure reference frequency determination interval and larger than the predetermined low-pressure reference frequency, the low-pressure probability of the tire is [1−(determination frequency−predetermined low-pressure reference frequency)/(predetermined low-pressure reference frequency determination interval)]*100%, when the determination frequency is lower than the predetermined low-pressure reference frequency, the low-pressure probability of the tire is 100%.

When the determination unit acquires one low-pressure probability, the determination unit determines the tire at a low pressure state in the case where the number of frequencies acquired in a specific speed interval is more than a predetermined number and the low-pressure probability of the tire is more than a predetermined probability value.

When the determination unit acquires two low-pressure probabilities, the determination unit determines the tire at a low pressure state in the case where the number of the frequencies acquired in the specific speed interval is more than the predetermined number and a value acquired by multiplying a low-pressure probability of a first speed interval and a low-pressure probability of a second speed interval by each other is more than the predetermined probability value.

When the determination unit acquires three low-pressure probabilities, the determination unit determines the tire at a low pressure state in the case where a value acquired by multiplying low-pressure probabilities of all speed intervals by each other is more than the predetermined probability value.

Another exemplary embodiment of the present disclosure provides a method for monitoring the pressure of a tire in a system for monitoring the pressure of a tire, the method comprises: measuring frequencies of multiple tires in a stop mode; calculating a first average frequency by accumulating the measured frequencies for each speed interval; measuring the frequencies of the multiple tires in a driving mode; calculating a second average frequency by accumulating the measured frequencies for each speed interval; setting the first average frequency for a normal pressure state and the second average frequency for determination of a low pressure state; calculating low-pressure probabilities for each speed interval of the tire by using the second frequency, a predetermined low-pressure reference frequency, and a predetermined frequency determination interval for determining low-pressure; and determining whether each tire is at low pressure state by aggregating the calculated low-pressure probabilities for each speed interval of the tire.

In the storing of the first average frequency as the normal pressure reference frequency, the system for monitoring the pressure of a tire stores the number of the accumulated frequencies together with the first average frequency when the number of the accumulated frequencies is more than a predetermined number in a stop mode.

In the storing of the second average frequency as the determination frequency, the system for monitoring the pressure of a tire stores a number of the accumulated frequencies together with the second average frequency when the number of the accumulated frequencies is more than the predetermined number in a driving mode.

In the calculating of the low-pressure probabilities for each speed interval of the tire, when the determination frequency is larger than a value acquired by adding a predetermined low-pressure reference frequency and a predetermined frequency determination interval for determining low-pressure, the low-pressure probability of the tire is 0%, when the determination frequency is smaller than the value acquired by adding the predetermined low-pressure reference frequency and the predetermined low-pressure reference frequency determination interval and larger than the predetermined low-pressure reference frequency, the low-pressure probability of the tire is [1−(determination frequency−predetermined low-pressure reference frequency)/(predetermined low-pressure reference frequency determination interval)]*100%, when the determination frequency is lower than the predetermined low-pressure reference frequency, the low-pressure probability of the tire is 100%.

In the determining of whether each tire is at the low pressure state, when the system for monitoring the pressure of a tire acquires one low-pressure probability, determines the tire at a low pressure state in the case where the number of frequencies acquired in a specific speed interval is more than a predetermined number and the low-pressure probability of the tire is more than a predetermined probability value.

In the determining of whether each tire is at the low pressure state, when the system for monitoring the pressure of a tire acquires two low-pressure probabilities, the system for monitoring the pressure of a tire determines that the tire is at the low pressure state in the case where the number of the frequencies acquired in the specific speed interval is more than the predetermined number and a value acquired by multiplying a low-pressure probability of a first speed interval and a low-pressure probability of a second speed interval by each other is more than the predetermined probability value.

In the determining of whether each tire is at the low pressure state, when the system for monitoring the pressure of a tire acquires three low-pressure probabilities, the system for monitoring the pressure of a tire determines that the tire is at the low pressure state in the case where a value acquired by multiplying low-pressure probabilities of all speed intervals by each other is more than the predetermined probability value.

According to exemplary embodiments of the present disclosure, a method and a system for monitoring the pressure of a tire that synthetically determine whether each tire is at low pressure by acquiring accumulation frequencies and low-pressure probabilities of all tires for each speed interval are provided to improve overall frequency analysis reliability.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
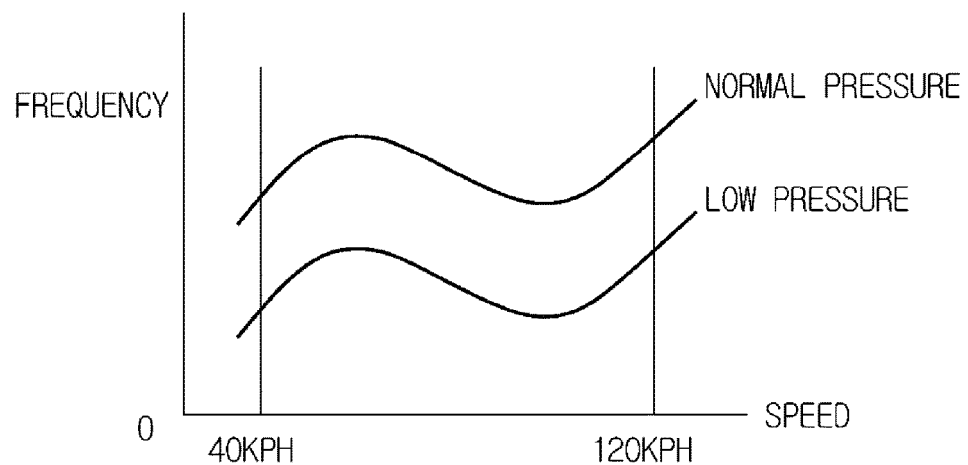
FIG. 1 is a graph illustrating a change in resonance frequency depending on a wheel speed of a tire.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is noted that technical terms used in the specification are used to just describe a specific exemplary embodiment and do not intend to limit the present disclosure. Unless otherwise defined in the specification, the technical terms used in the specification should be interpreted as meanings generally appreciated by those skilled in the art and should not be interpreted as excessively comprehensive meanings or excessively reduced meanings. When the technical term used in the specification is a wrong technical term that does not accurately express the spirit of the present disclosure, the technical term should be understood by being substituted by a technical term which can be correctly understood by those skilled in the art. A general term used in the present disclosure should be interpreted as defined in a dictionary or contextually, and should not be interpreted as an excessively reduced meaning.

Unless otherwise apparently specified contextually, a singular expression used in the specification includes a plural expression. In the specification, a term such as "comprising" or "including" should not be interpreted as necessarily including all various components or various steps disclosed in the specification, and it should be interpreted that some component or some steps among them may not be included or additional components or steps may be further included.

"Module" and "unit" which are suffixes for the components used in the specification are granted or mixed by considering only easiness in preparing the specification and do not have meanings or roles distinguished from each other in themselves.

Terms including ordinal numbers, such as 'first' and 'second', used in the specification can be used to describe various components, but the components should not be limited by the terms. The above terms are used only to discriminate one component from the other component. For example, a first component may be named a second component and similarly, the second component may also be named the first component, without departing from the scope of the present disclosure.

Hereinafter, exemplary embodiments of the present disclosure will be described in detail with reference to the accompanying drawings, in which like reference numerals refer to like or similar elements regardless of reference numerals and a duplicated description thereof will be omitted.

In describing the present disclosure, when it is determined that the detailed description of the publicly known art related to the present disclosure may obscure the gist of the present disclosure, the detailed description thereof will be omitted. It is noted that the accompanying drawings are only for easily understanding the spirit of the present disclosure and it should not be interpreted that the spirit of the present disclosure is limited by the accompanying drawings.

Figure 2:
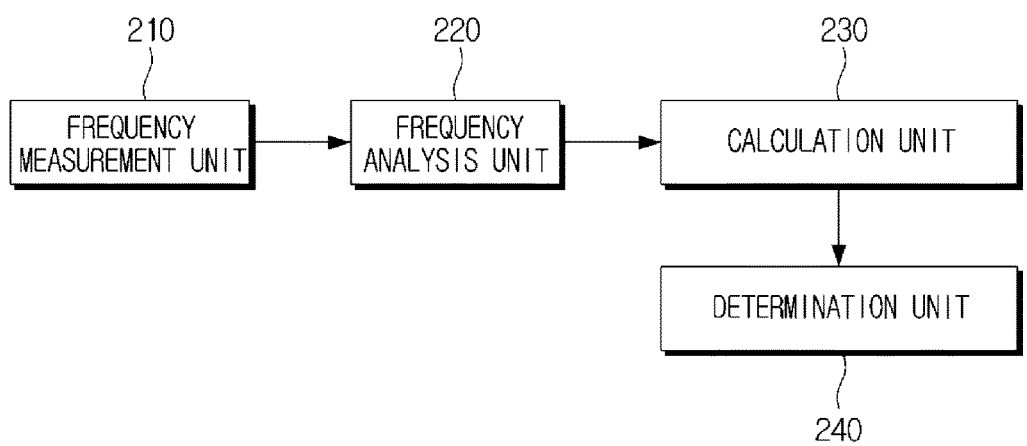
FIG. 2 is a block configuration diagram illustrating a configuration of a system for monitoring the pressure of a tire according to an exemplary embodiment of the present disclosure.

FIG. 2 is a block configuration diagram illustrating a configuration of a system for monitoring the pressure of a tire according to an exemplary embodiment of the present disclosure.

Referring to FIG. 2, the system for monitoring the pressure of a tire according to the exemplary embodiment of the present disclosure includes a frequency measurement unit 210, a frequency analysis unit 220, a calculation unit 230, and a determination unit 240.

The frequency measurement unit 210 measures frequencies of multiple tires mounted on the vehicle. In this case, the frequencies of the tires measured in excessive handle steering by a driver or when a brake pedal or an acceleration pedal is stepped are excluded. Herein, the frequency means a resonance frequency generated depending on a wheel speed of the tire.

Meanwhile, the system for monitoring the pressure of a tire according to the exemplary embodiment of the present disclosure operates in a tire replacement mode, namely a stop mode, to perform tire frequency learning depending on mounting of a new tire as the driver presses a tire replacement button mounted on a dashboard when replacing the tire.

The frequency analysis unit 220 sets a first average frequency for a normal pressure state and a second average frequency for determination of a low pressure state. The first average frequency is calculated by accumulating the measured frequencies for each speed interval in a stop mode and the second average frequency is calculated by accumulating the measured frequencies for each speed interval in a driving mode.

That is, the frequency analysis unit 220 calculates a first average frequency by accumulating the frequencies measured by the frequency measurement unit 210 for each speed interval in the tire replacement mode and thereafter, stores the first average frequency as a normal pressure reference frequency. In this case, the frequency analysis unit 220 completes calculating the first average frequency and thereafter, stores the number of the accumulated frequencies together with the first average frequency when the number of the accumulated frequencies is more than a predetermined number.

The frequency analysis unit 220 calculates a second average frequency by accumulating the frequencies measured by the frequency measurement unit 210 for each speed interval in a driving mode and thereafter, stores the second average frequency as a determination frequency. In this case, the frequency analysis unit 220 completes calculating the second average frequency and thereafter, stores the number of the accumulated frequencies together with the second average frequency when the number of the accumulated frequencies is more than the predetermined number.

The calculation unit 230 calculates the low-pressure probability based on the determination frequency calculated by the frequency analysis unit 220. The calculation unit 230 according to the present disclosure requires a low-pressure reference frequency and a low-pressure reference frequency determination interval in order to calculate the low-pressure probability. To this end, the system for monitoring the pressure of a tire according to the present disclosure may further include a storage unit (not illustrated) that configures by a map the low-pressure reference frequency and the low-pressure reference frequency determination interval set for each speed interval to correspond to a normal pressure reference frequency and stores the map.

A reference in which the calculation unit 230 calculates the low-pressure probability by using the determination frequency, and the low-pressure reference frequency and the low-pressure reference frequency determination interval set in the map will be described below.

When the determination frequency is larger than a value acquired by adding a predetermined low-pressure reference frequency and a predetermined low-pressure reference frequency determination interval, the low-pressure probability of the tire is 0%.

When the determination frequency is smaller than the value acquired by adding the predetermined low-pressure reference frequency and the predetermined low-pressure reference frequency determination interval and larger than the predetermined low-pressure reference frequency, the low-pressure probability of the tire is [1−(determination frequency−predetermined low-pressure reference frequency)/(predetermined low-pressure reference frequency determination interval)]*100%.

When the determination frequency is lower than the predetermined low-pressure reference frequency, the low-pressure probability of the tire is 100%.

The calculation unit 230 according to the present disclosure may calculate one to four low probabilities for each speed interval through the aforementioned method.

The determination unit 240 determines whether each tire is at low pressure state by aggregating the low-pressure probabilities for each speed interval calculated by the calculation unit 230. In detail, when the determination unit 240 acquires one low-pressure probability, in the case where the number of frequencies acquired in a specific speed interval is more than a predetermined number and the low-pressure probability of the tire is more than a predetermined probability value, it is determined that the tire is at the low pressure state and when the determination unit 240 acquires two low-pressure probabilities, in the case where the number of the frequencies acquired in the specific speed interval is more than the predetermined number and a value acquired by multiplying a low-pressure probability of a first speed interval and a low-pressure probability of a second speed interval by each other is more than the predetermined probability value, it is determined that the tire is at the low pressure state, and when the determination unit 240 acquires three low-pressure probabilities, in the case where a value acquired by multiplying low-pressure probabilities of all speed intervals by each other is more than the predetermined probability value, it is determined that the tire is at the low pressure state.

Figure 3:
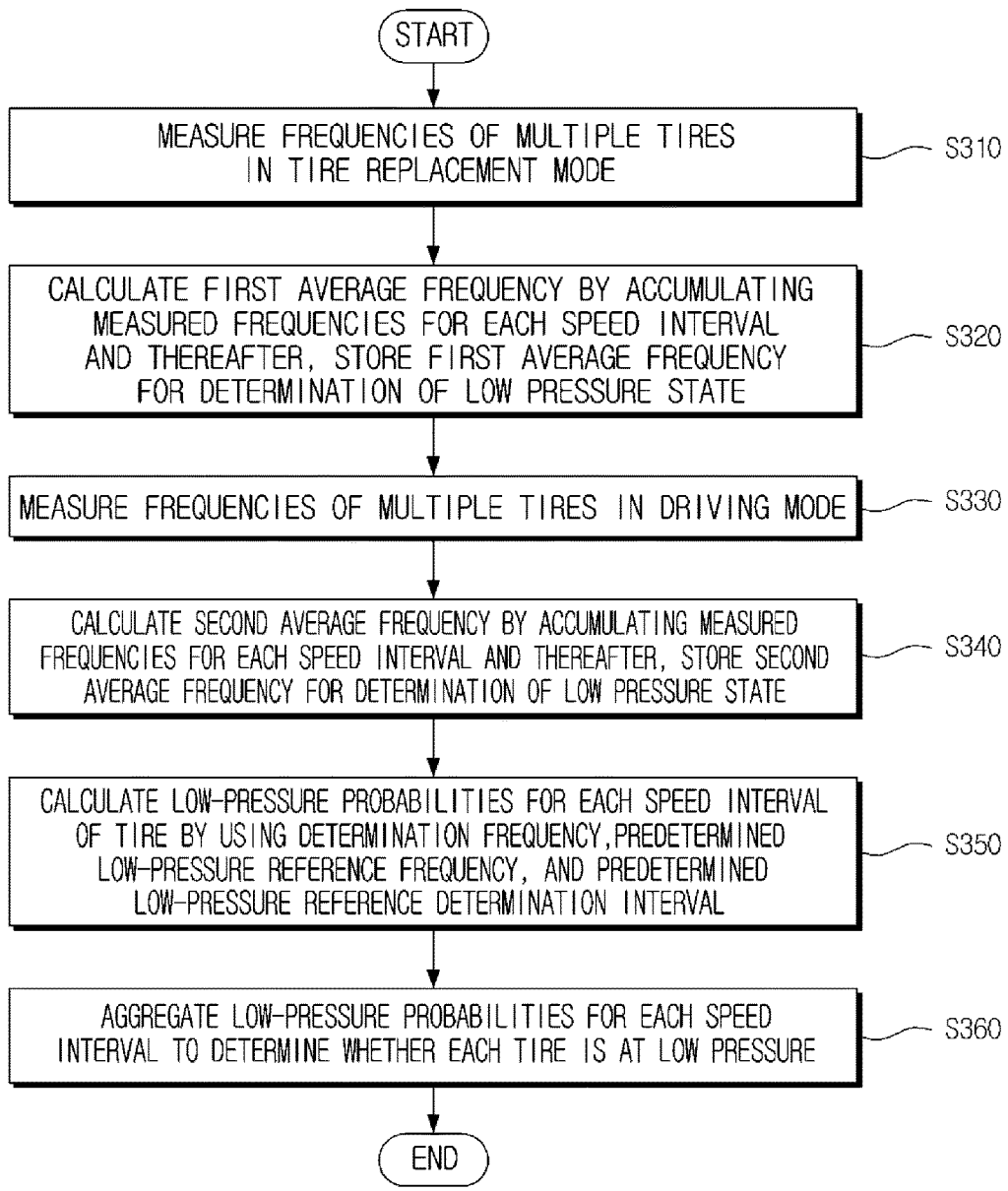
FIG. 3 is a flowchart illustrating a method for monitoring the pressure of a tire according to another exemplary embodiment of the present disclosure.

FIG. 3 is a flowchart illustrating a method for monitoring the pressure of a tire according to another exemplary embodiment of the present disclosure.

Referring to FIG. 3, the system for monitoring the pressure of a tire according to the present disclosure measures frequencies of multiple tires mounted on the vehicle in a tire replacement mode (S310).

The system for monitoring the pressure of a tire calculates a first average frequency by accumulating the measured frequencies for each speed interval and thereafter, stores the first average frequency for determination of a low pressure state (S320). In this case, the system for monitoring the pressure of a tire preferably completes calculating the first average frequency and thereafter, stores the number of the accumulated frequencies together with the first average frequency when the number of the accumulated frequencies is more than a predetermined number.

Subsequently, the system for monitoring the pressure of a tire measures the frequencies of the multiple tires mounted on the vehicle similarly to step S310 in a driving mode (S330).

The system for monitoring the pressure of a tire calculates a second average frequency by accumulating the measured frequencies for each speed interval and thereafter, stores the second average frequency for determination of a low pressure state (S340). In this case, the system for monitoring the pressure of a tire preferably completes calculating the second average frequency and thereafter, stores the number of the accumulated frequencies together with the second average frequency when the number of the accumulated frequencies is more than the predetermined number.

Subsequently, the system for monitoring the pressure of a tire calculates a low-pressure probability for each speed interval of the tire by using the determination frequency, a predetermined low-pressure reference frequency, and a predetermined low-pressure frequency determination interval (S350). A detailed method for the system for monitoring the pressure of a tire according to the present disclosure to calculate the low-pressure probability based on the determination frequency of each tire will be described in FIG. 4.

Last, the system for monitoring the pressure of a tire aggregates the low-pressure probabilities for each speed interval to determine whether each tire is at the low pressure state (S360). When the system for monitoring the pressure of a tire acquires one low-pressure probability, in the case where the number of frequencies acquired in a specific speed interval is more than a predetermined number and the low-pressure probability of the tire is more than a predetermined probability value, it is determined that the tire is at the low pressure state and when the determination unit 240 acquires two low-pressure probabilities, in the case where the number of the frequencies acquired in the specific speed interval is more than the predetermined number and a value acquired by multiplying a low-pressure probability of a first speed interval and a low-pressure probability of a second speed interval by each other is more than the predetermined probability value, it is determined that the tire is at the low pressure state, and when the determination unit 240 acquires three low-pressure probabilities, in the case where a value acquired by multiplying low-pressure probabilities of all speed intervals by each other is more than the predetermined probability value, it is determined that the tire is at the low pressure state.

Figure 4:
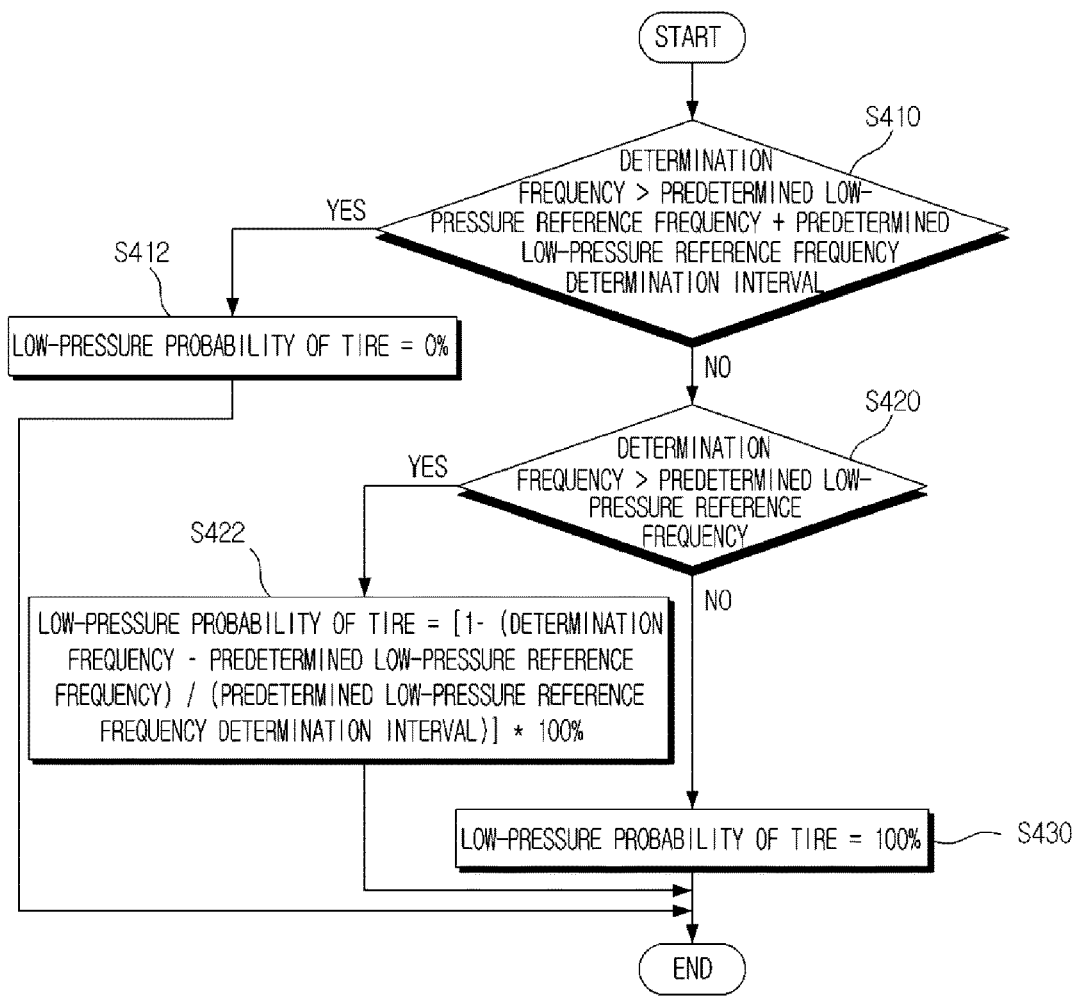
FIG. 4 is a flowchart illustrating a method for calculating a low-pressure probability of a tire according to yet another exemplary embodiment of the present disclosure.

FIG. 4 is a flowchart illustrating a method for calculating a low-pressure probability of a tire according to yet another exemplary embodiment of the present disclosure.

Referring to FIG. 4, it is determined whether a determination frequency is larger than a value acquired by adding a predetermined low-pressure reference frequency and a predetermined low-pressure reference frequency determination interval (S410).

When the determination frequency is larger than the value acquired by adding the predetermined low-pressure reference frequency and the predetermined low-pressure reference frequency determination interval, the low-pressure probability of the tire is 0% (S412).

When the determination frequency is smaller than the value acquired by adding the predetermined low-pressure reference frequency and the predetermined low-pressure reference frequency determination interval, it is determined whether the determination frequency is higher than the predetermined low-pressure reference frequency (S420).

When the determination frequency is higher than the predetermined low-pressure reference frequency, the low-pressure probability of the tire is [1−(determination frequency−predetermined low-pressure reference frequency)/(predetermined low-pressure reference frequency determination interval)]*100% (S422).

When the determination frequency is lower than the predetermined low-pressure reference frequency, the low-pressure probability of the tire is 100% (S430).

The aforementioned method may be implemented through various means. For example, the exemplary embodiments of the present disclosure may be implemented by hardware, firmware, software, or combinations thereof.

When the exemplary embodiments of the present disclosure are implemented by the hardware, a method according to the exemplary embodiments of the present disclosure may be implemented by one or more Application Specific Integrated Circuits (ASICs), Digital Signal Processors (DSPs), Digital Signal Processing Devices (DSPDs), Programmable Logic Devices (PLDs), (Field Programmable Gate Arrays (FPGAs), processors, controllers, microcontrollers, and microprocessors.

When the exemplary embodiments of the present disclosure are implemented by the firmware or the software, the method according to the exemplary embodiments of the present disclosure may be implemented in a module, a procedure or a function that performs the aforementioned functions or operations. A software code is stored in a memory unit to be driven by the processor. The memory unit is positioned inside or outside the processor to transmit and receive data to and from the processor by various already known means.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for monitoring a pressure of a tire, the system comprising:
   a frequency measurement unit configured to measure frequencies of multiple tires mounted on a vehicle;
   a frequency analysis unit configured to calculate a first average frequency in a tire replacement mode and to calculate a second average frequency in a driving mode;
   a calculation unit configured to calculate a low-pressure probability for a speed interval of the tire; and
   a determination unit configured to determine whether the tire is at low pressure state based at least in part on the low-pressure probability for the speed interval of the tire calculated by the calculation unit,
   wherein the determination of whether the tire is at low pressure state based at least in part on the low-pressure probability for the speed interval of the tire comprises determining whether each tire is at low pressure state when the number of frequencies acquired in a speed interval is more than a predetermined number,
   wherein the tire replacement mode includes an operation to perform tire frequency learning depending on mounting of a new tire.

2. The system of claim 1, wherein the frequency analysis unit is further configured to store a number of accumulated frequencies together with the first average frequency when the number of the accumulated frequencies is more than a predetermined number in a tire replacement mode, and to store a number of the accumulated frequencies together with the second average frequency when the number of the accumulated frequencies is more than the predetermined number in a driving mode.

3. The system of claim 1, wherein the frequency analysis unit is further configured to store the second average frequency as a determination frequency,
   wherein when the determination frequency is larger than a value acquired, the low-pressure probability of the tire is 0%.

4. The system of claim 1, wherein when the system acquires one low-pressure probability, the determination unit is configured to determine that the tire is at a low pressure state when a number of frequencies acquired in the speed interval is more than a predetermined number and the low-pressure probability of the tire is more than a predetermined probability value.

5. The system of claim 1, wherein when the system acquires two low-pressure probabilities, the determination unit is configured to determine that the tire is at a low pressure state when a number of the frequencies acquired in the speed interval is more than a predetermined number and a value acquired by multiplying a low-pressure probability of a first speed interval by a low-pressure probability of a second speed interval is more than a predetermined probability value.

6. A method for monitoring a pressure of a tire, the method comprising:
   measuring frequencies of multiple tires in a tire replacement mode;
   calculating a first average frequency in the tire replacement mode;
   measuring the frequencies of the multiple tires in a driving mode;
   calculating a second average frequency in the driving mode;
   calculating a low-pressure probability for a speed interval of the tire; and
   determining whether the tire is at low pressure state based at least in part on the calculated low-pressure probability when the number of frequencies acquired in a speed interval is more than a predetermined number,
   wherein the tire replacement mode includes an operation to perform tire frequency learning depending on mounting of a new tire.

7. The method of claim 6, further comprising:
   storing the first average frequency as a normal pressure reference frequency; and
   storing a number of accumulated frequencies together with the first average frequency when the number of the accumulated frequencies is more than a predetermined number in a tire replacement mode.

8. The method of claim 6, further comprising:
   storing the second average frequency as a determination frequency; and
   storing a number of the accumulated frequencies together with the second average frequency when the number of the accumulated frequencies is more than a predetermined number in a driving mode.

9. The method of claim 8, wherein, in calculating the low-pressure probability for the speed interval of the tire, when the determination frequency is larger than a value acquired, the low-pressure probability of the tire is 0%.

10. The method of claim 8, wherein, in calculating the low-pressure probability for the speed interval of the tire, when the determination frequency is smaller than a value acquired, the low-pressure probability of the tire is [1-(determination frequency-predetermined low-pressure reference frequency)/(predetermined low-pressure reference frequency determination interval)]*100%.

11. The method of claim 8, wherein, in calculating the low-pressure probabilities for the speed interval of the tire, when the determination frequency is lower than the predetermined low-pressure reference frequency, the low-pressure probability of the tire is 100%.

12. The method of claim 6, wherein determining that the tire is at a low pressure state when a number of frequencies acquired in the speed interval is more than a predetermined number and the low-pressure probability of the tire is more than a predetermined probability value.

13. The method of claim 6, wherein determining that the tire is at a low pressure state when a number of the frequencies acquired in the speed interval is more than the predetermined number and a value acquired by multiplying a low-pressure probability of a first speed interval by a low-pressure probability of a second speed interval is more than a predetermined probability value.

14. The method of claim 6, wherein determining that the tire is at a low pressure state when a value acquired by multiplying low-pressure probabilities of all speed intervals by each other is more than a predetermined probability value.

* * * * *